United States Patent
Masters et al.

(10) Patent No.: US 8,893,236 B2
(45) Date of Patent: Nov. 18, 2014

(54) SYSTEMS, METHODS, AND COMPUTER PROGRAM PRODUCTS FOR AUTHENTICATING HUMAN USERS OF A COMPUTER SYSTEM

(71) Applicant: Red Hat, Inc., Raleigh, NC (US)

(72) Inventors: Jonathan Masters, Raleigh, NC (US); Richard Monk, Raliegh, NC (US); Robert Lowe, Moorooka (AU)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 13/776,056

(22) Filed: Feb. 25, 2013

(65) Prior Publication Data

US 2014/0245392 A1    Aug. 28, 2014

(51) Int. Cl.
*H04L 29/06* (2006.01)
*G06F 21/31* (2013.01)

(52) U.S. Cl.
CPC ............. *H04L 63/08* (2013.01); *G06F 21/313* (2013.01)
USPC ............................................................ 726/4

(58) Field of Classification Search
None
See application file for complete search history.

(56) References Cited

U.S. PATENT DOCUMENTS

| | | | |
|---|---|---|---|
| 5,793,866 A * | 8/1998 | Brown et al. | 380/2 |
| 7,454,784 B2 | 11/2008 | Sahota et al. | |
| 7,865,439 B2 | 1/2011 | Seifert et al. | |
| 7,908,324 B2 * | 3/2011 | Shochet et al. | 709/205 |
| 8,281,129 B1 * | 10/2012 | Asghari-Kamrani et al. | 713/168 |
| 2002/0169988 A1 * | 11/2002 | Vandergeest et al. | 713/201 |
| 2006/0265243 A1 | 11/2006 | Racho et al. | |
| 2007/0005508 A1 | 1/2007 | Chiang | |
| 2008/0184351 A1 * | 7/2008 | Gephart et al. | 726/7 |
| 2008/0226047 A1 * | 9/2008 | Reumann et al. | 379/142.04 |
| 2011/0026699 A1 * | 2/2011 | Amir et al. | 379/142.05 |
| 2012/0144198 A1 * | 6/2012 | Har et al. | 713/170 |
| 2014/0009560 A1 * | 1/2014 | Krishnan et al. | 348/14.03 |

FOREIGN PATENT DOCUMENTS

WO    WO 2010/109332    9/2010

* cited by examiner

*Primary Examiner* — David Pearson

(74) *Attorney, Agent, or Firm* — Haynes and Boone, LLP

(57) ABSTRACT

A computer program product having a computer readable medium tangibly recording computer program logic for use in a secure computer system with a first human user and a second human user being authorized users of the secure computer system, the computer program product including code to receive input from the first human user to select the second human user for authentication, code to electronically generate a secure code in response to the input from the first human user, code to display the secure code to the first human user, code to allow the second human user access to the secure computer system after the second human user has been verified by the secure computer system, and code to display the secure code to the second human user as the second human user accesses the secure computer system.

18 Claims, 6 Drawing Sheets

Employee Verification jblow  log out  flag a suspicious authentication  help

Search
Found 3 matching results when searching for 'doe'.

Authenticate  Please select the employee to authenticate from the list below and then click "Authenticate"

| Select | Username | Full name | Title |
|---|---|---|---|
| ○ | jroe | Jane Roe | Consultant |
| ○ | jdoakes | Joe Doakes | Intern |
| ⊙ | jdoe | Jon Doe | Principal Information Security Analyst |

Search again: [    ] [Search]

Fig. 2

SYSTEMS, METHODS, AND COMPUTER PROGRAM PRODUCTS FOR AUTHENTICATING HUMAN USERS OF A COMPUTER SYSTEM

BACKGROUND

1. Technical Field

The present disclosure generally relates to authenticating human users of a computer system and, more specifically, to using codes generated by a secure computer system to authenticate human users.

2. Related Art

Conventional methods are available to authenticate human users of a system. In one example, a human user of an on-line computer account has a username and password pair, and the user may be authenticated by presenting the username and password to a website. While the above-described method is not perfect—e.g., criminals may steal the real user's credentials—it is widely used and widely trusted to provide a secure communication channel.

In another example, a human user makes a telephone call to a bank. Before the human user is allowed to discuss his or her account, the user is asked to provide an identifier, such as a password in addition to an account number. However, presentation of such credentials over the phone risks that the credentials might be intercepted by a malicious party.

BRIEF DESCRIPTION OF THE DRAWINGS

FIGS. 2 and 3 illustrate an example web portal interface used by the first human user, according to one embodiment.

BRIEF SUMMARY

Figure 1:
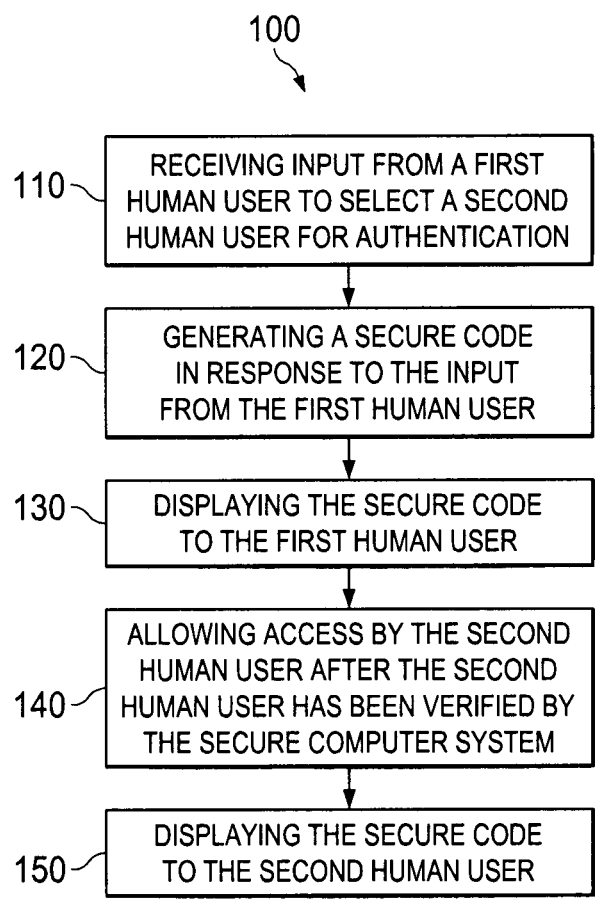
FIG. 1 is an illustration of an example method, adapted according to one embodiment

According to one embodiment, a computer program product having a computer readable medium tangibly recording computer program logic for use in a secure computer system with a first human user and a second human user being authorized users of the secure computer system, the computer program product including code to receive input from the first human user to select the second human user for authentication, code to electronically generate a secure code in response to the input from the first human user, code to display the secure code to the first human user, code to allow the second human user access to the secure computer system after the second human user has been verified by the secure computer system, and code to display the secure code to the second human user as the second human user accesses the secure computer system.

According to another embodiment, A mutual authentication system including an authentication server for receiving respective credentials from a first human user and a second human user and granting or denying access to a secure computer system based on the respective credentials, and a communication server communicatively coupled to the authentication server and to the first and second human users, the communication server allowing access to authentication services by the first and second human users according to whether access is granted or denied by the authentication server; the communication server including functionality to generate a secure code in response to a request by the first human user and to make the secure code available to the second human user when the second human user is granted access to the secure computer system.

According to yet another embodiment, A method of authenticating a participant to a conversation, the method including accessing a secure system by a first party to the conversation, selecting a second party from a database associated with the secure system, where the first party desires to authenticate the second party, generating a code within the secure system in response to a request by the first party, making the code available to the second party when the second party is verified within the secure system, receiving feedback, from the second party to the first party, including the code, and authenticating the second party in response to receiving the feedback.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

According to the various aspects of the present disclosure, a method, system, and computer program product are discussed below that allow for authenticating a human user to a conversation. Various aspects may be applied to less secure communication channels, such as phone conversations, to provide a level of authentication that is satisfactory for many applications to then allow passwords (or other sensitive information) to be exchanged between users over the communication channel.

In a conventional example, if an employee of a company receives a phone call or instant message from another person who also claims to be employed at the same company, the employee receiving the phone call has no robust and flexible way of verifying whether the caller is actually employed by the company and/or is correctly identified. Example embodiments described below may be used to address the problem by providing a way to authenticate human users, whether such human users are telephone callers or use another communication channel.

In an example use case, the employee receives a call from the caller, where the caller claims to be a particular person who is employed by the same employer. The called employee logs in to a secure computer system, such as a website that uses username password pairs, security tokens, or other credentials. The secure computer system provides a mutual authentication system that can be accessed by the called employee once logged in.

Once the called employee logs in to the mutual authentication system, he or she searches in a database of company employees for the calling employee using a name presented by the calling employee. Assuming that the calling employee identity is found in the database, the called employee selects the calling employee identity and instructs the system to generate an authentication code. In response, the mutual authentication system creates a secure authentication code, which at this point is restricted by access to the called employee (who is currently logged on) and the person whose identity was selected from the database. The called employee sees the code on a display screen.

The calling employee also logs in to the mutual authentication system and, assuming the calling employee gave the correct identity, is able to access the code. For instance, upon logging in to the mutual authentication system, the system may present the code along with a message to the calling employee that someone is trying to authenticate him or her. The calling employee then may read the code over the phone to the called employee or otherwise present the code. The called employee then compares the code read by the calling employee to the code on his or her display, and if they match, then the called employee can be confident that the person he or she is talking to is authenticated.

On the other hand, if the calling employee fails to provide the correct code, then it may be possible that the calling employee user is not being truthful regarding identity. In fact, if the calling employee is not actually an employee of the company, then the calling employee would not be able to access the mutual authentication system (password fraud notwithstanding). And in some cases in which the calling employee is an employee of the company but is impersonating another employee, then the calling employee would not be able to access the secure code (even if the calling employee was able to access the mutual authentication system).

In some examples, the codes last for a short amount of time, and then disappear to minimize any risk or confusion associated with use or reuse of old codes. Also, some examples may use a platform (such as a website or a mobile application) that is easily accessible to human users even when those users are away from their homes and offices in order to authenticate people in as many locations as possible.

The example above addresses the issue of how to authenticate a human user over an insecure communication channel, such as phone-to-phone. Such example embodiment leverages the authenticating nature of the secure computer system to attempt to ensure that codes are generated and accessed by legitimate users only.

Furthermore, the above example provides authentication between the human users without causing either user to divulge personal identifying information (e.g., a password) to the other user, thereby protecting passwords and other credentials. By contrast, the secure code acts a session token that does not have meaning outside of the communication session, so that passing the code between parties to the conversation raises minimal risk (if any risk at all). Various embodiments are described in more detail below with respect to FIGS. 1-6.

Figure 5:
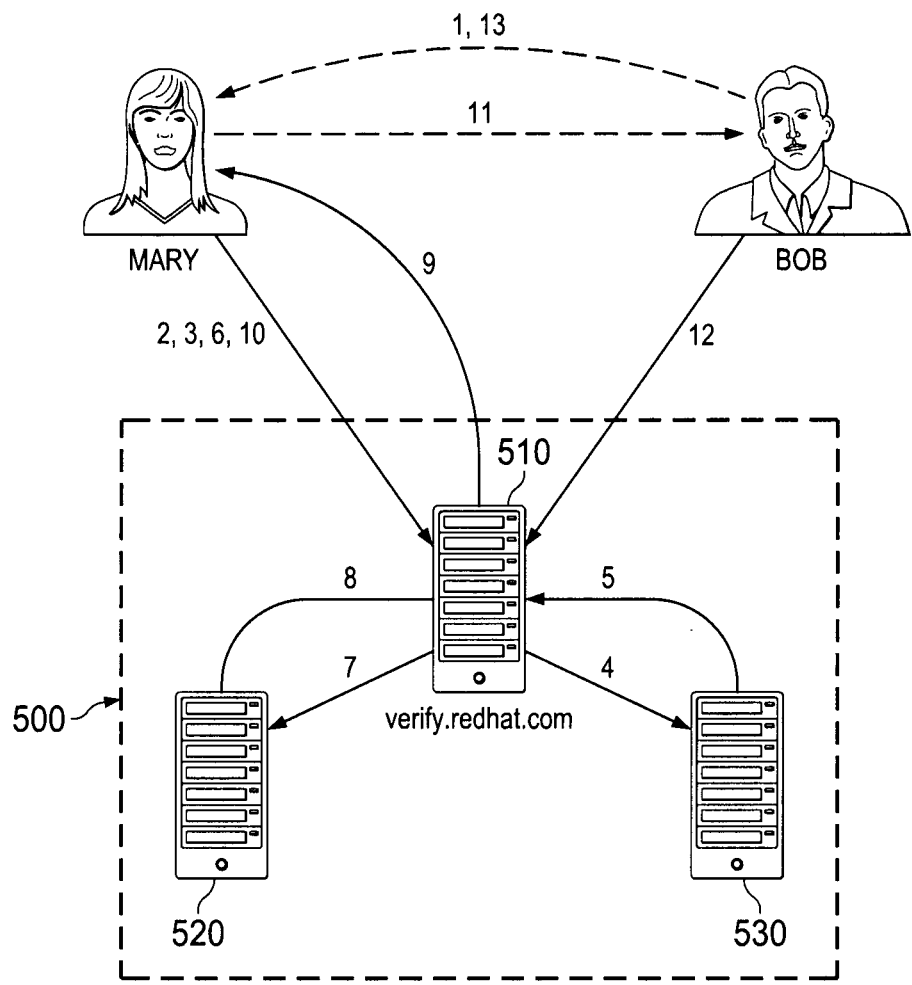
FIG. 5 illustrates an example system adapted according to one embodiment.

FIG. 1 is an illustration of example method 100, adapted according to one embodiment. The scope of the disclosure is not limited to web-portal embodiments, though one example includes one or more web servers on the Internet or an intranet performing the actions of method 100. The actions of FIG. 1 may be performed by one or more applications running on one or more processor-based devices to implement the functions of computer system 500 (FIG. 5). In some embodiments, the various actions are carried out by one or more computer processors executing computer code to provide the described functionality.

In action 110, the system receives input from a first human user to select a second human user for authentication. In this example, both the first human user and the second human user are authorized users of a secure computer system that generates the secure code and presents the secure code to the second human user. Thus, even before action 110 takes place, the secure computer system may log in the first human user. The second human user may log in before or after the first human user.

In any event, action 110 in this example includes the system receiving input from the first human user. In an example embodiment which uses a web portal, the system may present a web site into which the first human user enters a name of the second human user. The system may then provide a list of possible candidates that match, or are reasonably similar to, the string of characters entered by the first human user. Various embodiments may use any appropriate searching technology including string matching, natural language-type searching, and/or the like.

FIG. 2 is an illustration of an example web portal interface 200 that might be used by the first human user during action 110. In the example of FIG. 2, the first human user (Joe Blow) has entered a name of the second human user (doe), and the interface 200 has returned three possible candidates 210, 220, 230 for selection by the first human user. Further in this example, the first human user has selected candidate 230 (Jon Doe) as the closest match to what he believes the second human user asserted as an identity. The first human user then selects the AUTHENTICATE button 240 to generate the secure code.

In action 120, the system generates a secure code in response to the input from the first human user. Any appropriate technique to generate the secure code is within the scope of the disclosure. In this example embodiment, the computer system uses a pseudorandom number generator (PRNG) to generate a short alphanumeric string as the secure code. In some embodiments, the secure code is not derivable from any information incident to the conversation (e.g., a user name, time of day, etc.) so as to prevent unauthorized users from guessing or independently generating the code.

In action 130, the system displays the secure code to the first human user. In this example, a web server in the computer system causes the secure code to be displayed by sending web page data over a network to a web browser. The web browser, for its part, receives the data and renders interface 200 on a display device. The browser may run on a processor-based device associated with the first human user. Action 130 allows the first human user to be able to compare the generated code to a code returned by the second human user (see action 150).

Figure 3:
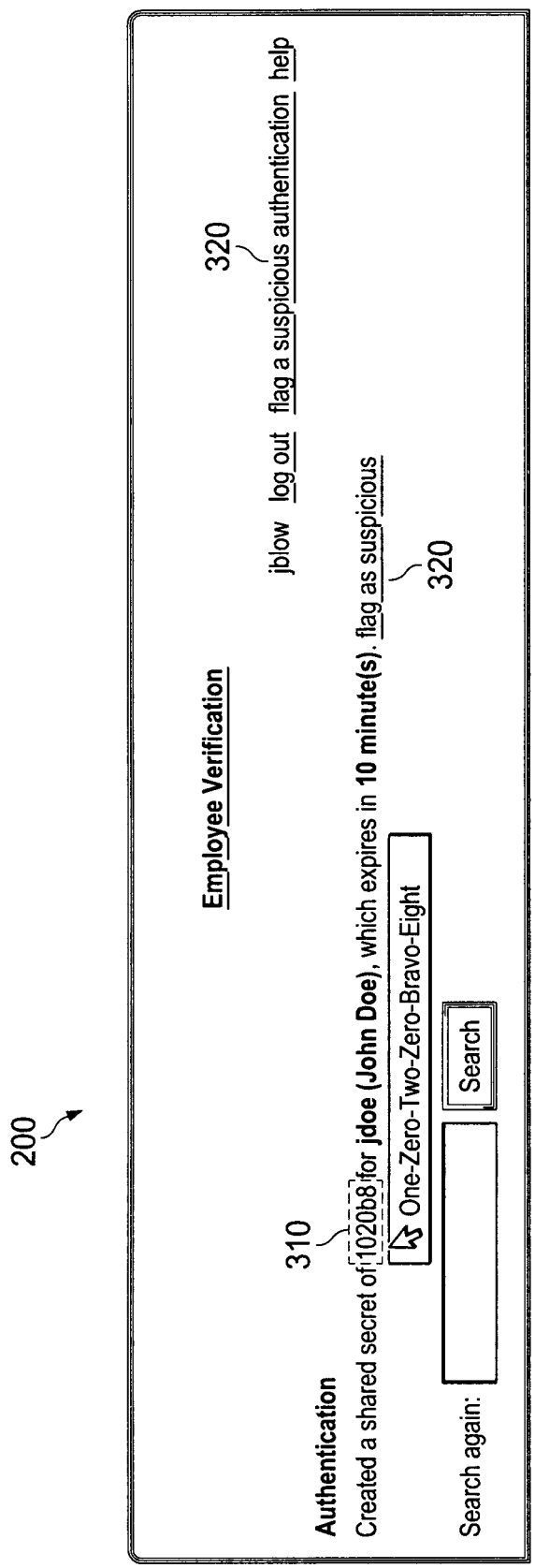

FIG. 3 is an illustration of another screen within example interface 200, adapted according to one embodiment, this time displaying secure code 310 upon a computer monitor. The first human user may refer to secure code 310 on interface 200 when the second human user later returns the code. Also, interface 200 includes an option 320 for the first human user to flag suspicious behavior, e.g., in an instance wherein the second human user fails to return the correct code.

While the present example shows a web interface, it is noted that the scope of the disclosure includes any appropriate technique for the first or second user to access the mutual authentication system. For instance, interface 200 may be displayed as an application on a smartphone or tablet computer or other processor-based device. Similarly, interface 400 (FIG. 4, discussed below) may also be associated with a web page, application, or other form.

In action 140, the mutual authentication system allows access by the second human user after the second human user has been verified in the secure computer system. For instance, the second human user may log in to the secure computer system in a manner similar to how the first human user logs in (e.g., by password, RSA token or other security token, hardware key, etc.). The example method of FIG. 1 assumes that only authorized users are able to gain access to the secure computer system, so that once a user has logged in, that user has been authenticated to some degree.

In action 150, the mutual authentication system displays the secure code to the second human user. For instance, the web server may send data over a network to a web browser associated with the second human user. The web browser then renders a page on a display to present the code to the second human user. The web browser may run on a processor-based device associated with the second human user.

Figure 4:
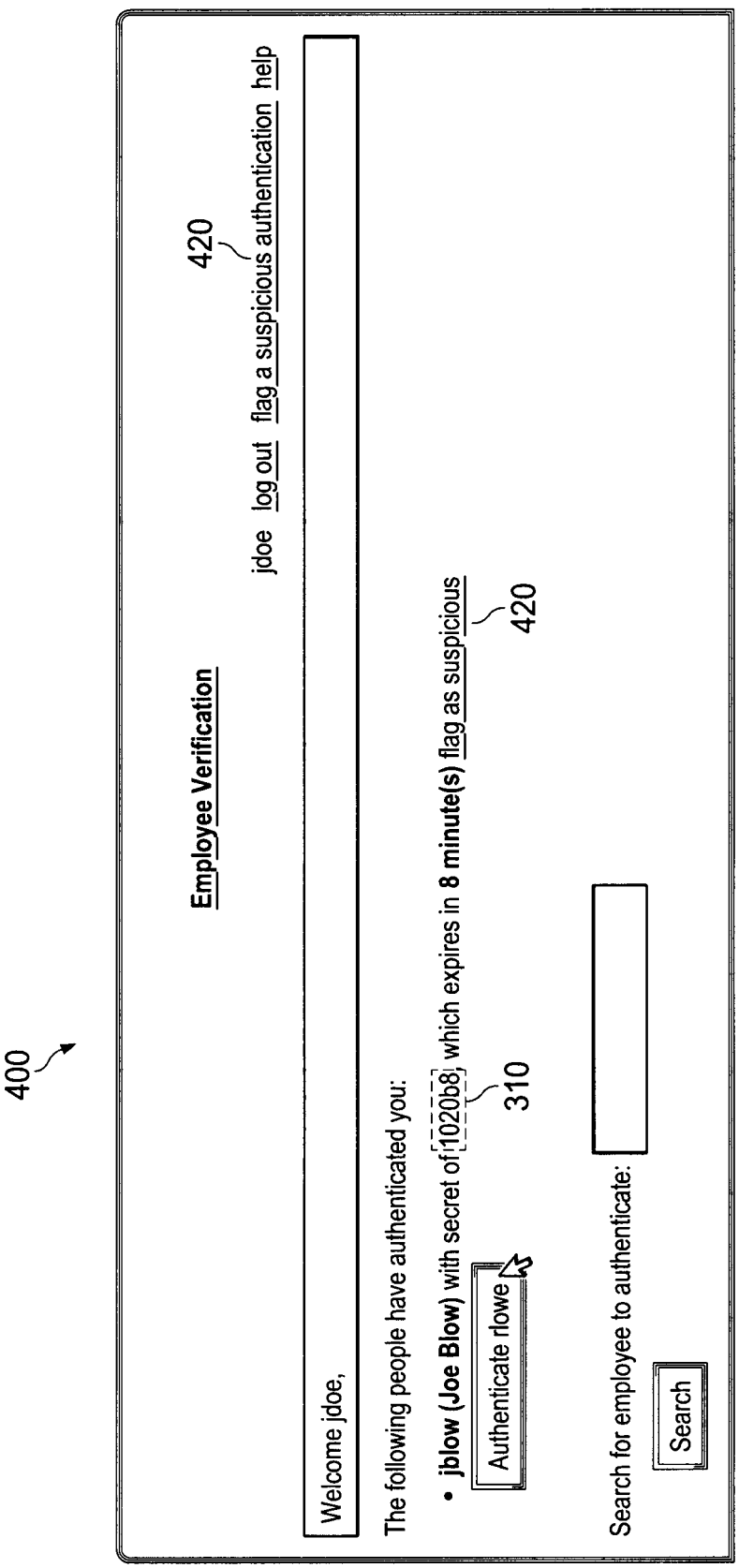
FIG. 4 is an illustration of an example web portal interface, which may be presented by the mutual authentication system to the second human user, according to one embodiment.

FIG. 4 is an illustration of interface 400, which may be presented by the mutual authentication system to the second human user, according to one embodiment. Interface 400 displays code 310 and a message that the first human user (Joe Blow in this example) is attempting to authenticate the second human user. Interface 400 also includes option 420 for the second human user to flag suspicious behavior as well.

If the first human user and the second human user are currently in contact over the phone, the second human user can return code 310 by reading it over the phone to the first human user. The first human user can then compare the code returned by the second human user to the code 310 on interface 200 (FIG. 3), thereby authenticating the second human user.

While the scope of embodiments does not exclude the possibility that other users (such as administrators) who are not the first or second human user may access the code, many embodiments will generally limit access to the first and second users. Such limitation may ensure trustworthiness of the mutual authentication system.

While the example of FIGS. 1-4 is described with respect to two company employees, the scope of the disclosure is not so limited. In fact, any relationship between two people that can benefit from authentication may benefit from the concepts illustrated above. For instance, if a bank is contacted over the phone by a person purporting to be a bank customer, the bank personnel on the phone may authenticate the caller using method 100 (where the bank personnel acts according to the actions of the first human user, and the caller acts according to the actions of the second human user on the bank's secure computer system). Such protocol may be used instead of, or in addition to, asking the caller to divulge an account password over the phone.

Furthermore, while the above example refers to a phone conversation, the scope of embodiments includes any appropriate channel of communications between the human users. For instance, users communicating by email, text, instant messenger, and the like may also use method 100 to authenticate each other.

The scope of embodiments is not limited to the particular flow shown in FIG. 1. Rather, other embodiments may add, omit, rearrange, or modify one or more actions in accordance with a given design. For instance, method 100 may continue with the second human user authenticating the first human user by selecting the first human user and generating another code.

FIG. 5 illustrates an example system 500 adapted according to one embodiment. System 500 includes web server 510, which may serve pages to requesting web browsers or other applications running on a computer that has a human user. For instance, web server 510 may run on a desktop computer, laptop computer, server computer, or other appropriate processor-based device that is connected to the Internet or other data network.

System 500 is a secure computer system, requesting authentication credentials from users and only allowing users to log in if their credentials can be verified. System 500 thus includes authentication server 530, which allows users to log in in a manner similar to that described above with respect to action 140 (FIG. 1). For instance, Bob and Mary may each have respective credentials (e.g., username/password pairs, hardware or software keys) and may present those credentials in order to access the services provided by system 500. In one example, Mary goes to the website provided by server 510 and enters a username/password pair. Web server 510 then passes Mary's credentials to authentication server 530, which either logs Mary in or denies Mary access depending upon whether her provided credentials can be verified. Authentication server 530 may run on a desktop computer, laptop computer, server computer, or other appropriate processor-based device that is in communication with web server 510.

System 500 also includes directory server 520, which in this example hosts a directory of users who are currently employed by the company. Web server 510 accesses the directory server 520 in order to compare user input to a list of employees and then to return a list of potential candidates to a first user, as described above with respect to action 110 (FIG. 1) and FIG. 2. Server 520 may run on a desktop computer, laptop computer, server computer, or other appropriate processor-based device that is in communication with web server 510. Furthermore, server 520 may be implemented using Lightweight Directory Assist Protocol (LDAP) or other appropriate technology for maintaining directory information.

FIG. 5 shows servers 510, 520, 530 as being implemented as separate hardware devices, but in some embodiments, servers 510, 520, 530 are software applications that can be run on any appropriate machine. In other embodiments, two or more of servers 510, 520, 530 may be run on a same hardware device. Any appropriate configuration of hardware devices may be adopted for server 510, 520, 530. Examples of appropriate hardware device include server computers, desktop computers, laptop computers, tablet computers, and the like.

In some embodiments, system 500 may be an enterprise system such that it is associated with a single company and located within the company's intranet. In other embodiments, system 500 may be cloud-based, such that processing resources are on the Internet, virtualized, and shared with other unrelated entities. Any appropriate architecture may be used to configure system 500.

Bob and Mary are illustrated as two human users of system 500, and it is understood that each of Bob and Mary use some kind of processor-based device to access system 500, such as a laptop computer, tablet computer, smartphone, or the like. Furthermore, Bob and Mary may use the same or different devices to communicate with each other. For instance, Bob and Mary may both access system 500 from respective tablet computers and communicate with each other using cellular or landline phones. In another example, Bob and Mary each use one device to access system 500 and to carry on their conversation by, e.g., using smartphones that allow simultaneous web access and voice service. The concepts described herein are flexible and can be adapted to any communication channel between Bob and Mary and any channel between Bob/Mary and system 500. The following example refers to Bob and Mary performing actions, and it is understood that in some instances those actions are assisted by, or carried out by, one or more devices associated with Bob and Mary.

FIG. 5 includes arrows showing communication between two points, and the numbers accompanying the arrows refer to the actions described below. At action 1, Bob places a telephone call to Mary. Mary wishes to authenticate Bob before discussing confidential information of their common employer.

At action 2, Mary goes to the website verify.redhat.com using a web browser on one of her devices. In another example, Mary may open an application on a smartphone or tablet computer to access verify.redhat.com to access web server 510.

At action 3, Mary logs in using her authentication credentials. Examples may include any appropriate credentials, including but not limited to a two-factor system (username and password+RSA token code) or a single-factor system (username and password).

At action 4, system 500 checks Mary's credentials by sending a communication to authentication server 530. Authentication server 530 then verifies the credentials using any appropriate technique (e.g., comparing the credentials to a table of credentials).

At action 5, server 530 returns a pass/fail result for the authentication attempt. If passed, Mary is logged into system 500. If failed, Mary is denied access to system 500. The following example assumes that Mary's credentials are valid and that she is granted access to system 500.

At action 6, Mary searches for Bob's first name and/or last name using a search tool provided by servers 510 and 520. An example is shown at FIG. 2, in which initial search criteria (e.g., a character string the same as or similar to Bob's name) returns one or more result candidates. For instance, Mary may enter search criteria, and at action 7 system 500 queries the directory at server 520 using those criteria. In response, at action 8, server 520 returns results to web server 510. In some instances, the results may be null but in other instances the results may include one or more possible matches. At action 9, web server 510 presents the results to Mary, and she is prompted to select a user to authenticate.

At action 10, Mary chooses the person she wishes to authenticate (in this case, Bob) and then proceeds with the authentication process by, e.g., clicking an "Authenticate" button (FIG. 2). In response to Mary's selection, server 510 generates a short code, such as code 310 of FIG. 3.

At action 11, Mary asks Bob to also log in to verify.redhat.com and read the code back to her. Mary may make her request over the phone or other non-secure communication channel.

At action 12, Bob logs into verify.redhat.com (using his respective credentials, similar to actions 4 and 5). Once logged into system 500, web server 510 displays an interface for Bob that shows the code.

At action 13, Bob reads the code back to Mary over the phone. Mary is then able to confirm Bob (if Bob provides the correct code) or understand that Bob may not be a legitimate caller (if Bob fails to provide the correct code). Following this authentication process, Bob could also authenticate Mary using a similar process.

Although not shown in FIG. 5, the interface provided by web server 510 may include an option to flag suspicious activities or to indicate that security has possibly been breached. An example is shown as options 320, 420 of FIGS. 3 and 4, where a user may indicate suspicious activity by selecting a link. Once selected, the link may open a text-entry box that allows a user to enter notes that are then sent to an Information Technology (IT) or security professional. In another example, the web portal may include a duress flag, which one party may select to indicate to the other party discretely that security is being breached. Any appropriate security add-ons may be included to complement the authentication systems and methods described above.

Various embodiments may provide one or more advantages. For instance, most conventional phone systems have only very limited security features (e.g., caller ID). Various embodiments described above may be used to add a more effective layer of security to conversations over the phone by allowing the parties to verify each other within a secure computer network.

Another advantage of certain embodiments is that they may allow some systems to minimize or eliminate instances in which a human user is asked to provide a password to another human user. For instance, when a user calls a bank to discuss his account, the bank may use a system similar to that described above to generate a secure code for that particular conversation, instead of asking the user for a password over the phone. Fewer instances of human-to-human password transactions may further minimize the possibility of passwords being stolen. However, various embodiments may be used in addition to human-to-human password transactions to provide an additional level of security to a password-based system.

Various examples described above may be implemented on a system that can be accessed by a variety of devices with any of a variety of operating systems from any location with an adequate data connection. For instance, web-based interfaces tend to be accessible by many different devices and operating systems by use of conventional web browsers. Also, providing a library of specialized applications for a variety of different devices (especially mobile devices) may increase accessibility. Such embodiments may provide special utility by allowing for the authentication of colleagues who are traveling or calling in from an unusual location.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

Figure 6:
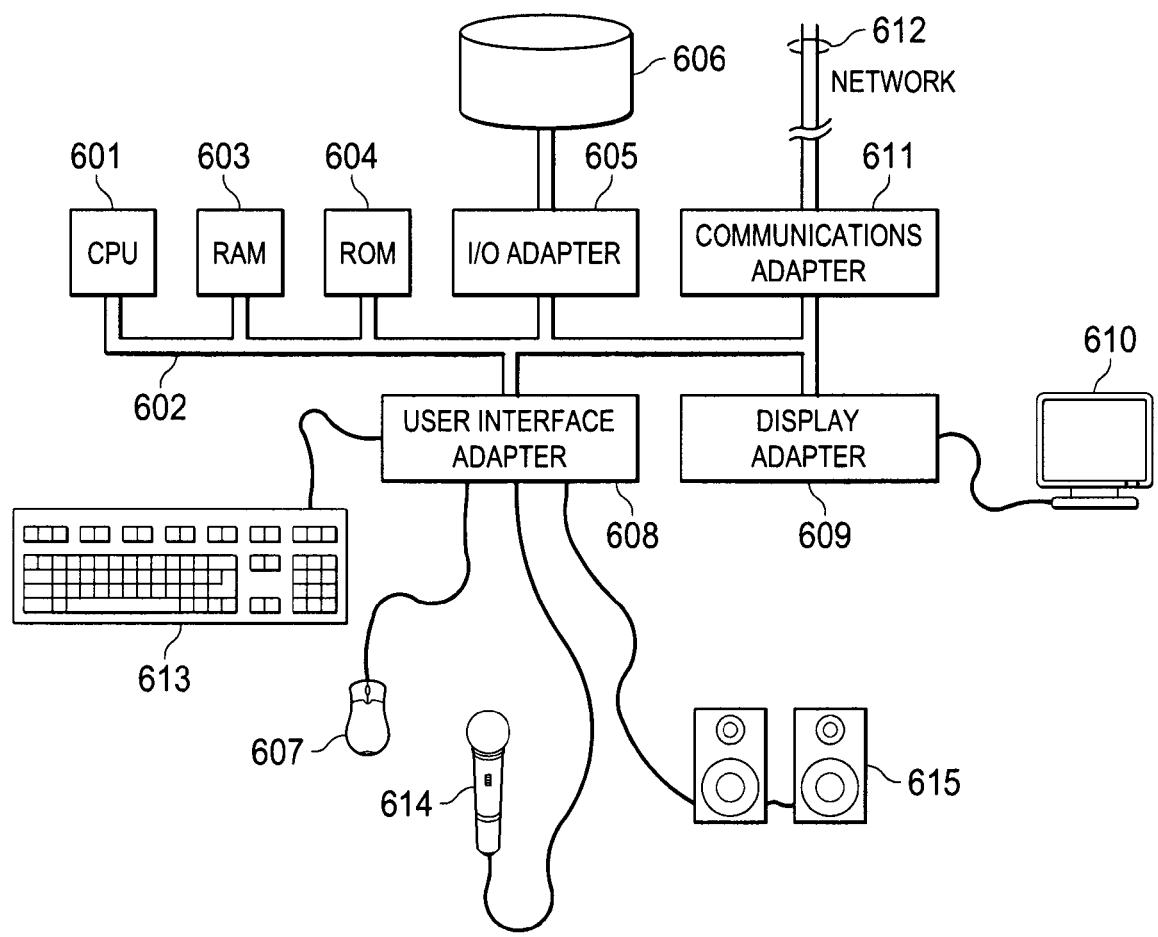
FIG. 6 illustrates an example computer system adapted according to one embodiment.

FIG. 6 illustrates an example computer system 600 adapted according to one embodiment of the present disclosure. That is, computer system 600 comprises an example system on which embodiments of the present disclosure may be implemented (such as any one or all of servers 510, 520, 530, all in FIG. 5, or a device employed by a human user to access the mutual authentication system).

Central processing unit (CPU) 601 is coupled to system bus 602. CPU 601 may be any general purpose or specialized purpose CPU. However, the present disclosure is not restricted by the architecture of CPU 601 as long as CPU 601 supports the inventive operations as described herein. CPU 601 may execute the various logical instructions according to embodiments of the present disclosure. For example, one or more CPUs, such as CPU 601, may execute machine-level instructions according to the exemplary operational flow described above in conjunction with FIG. 1.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs.

Computer system 600 also preferably includes input/output (I/O) adapter 605, communications adapter 611, user interface adapter 608, and display adapter 609. Communications adapter 611 may, in certain embodiments, enable a user to interact with computer system 600 in order to input information, such as a request to authenticate another user, over communications link 612.

I/O adapter 605 preferably connects to storage device(s) 606, such as one or more of hard drive, compact disc (CD) drive, solid state drive, etc. to computer system 600. The storage devices may be utilized when system memory RAM 603 is insufficient for the memory requirements associated with storing media data. Communications adapter 611 is preferably adapted to couple computer system 600 to communication link 612 (e.g., the Internet, a LAN, a cellular network, etc.). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display a secure code to a human user (in the case of a user device).

While FIG. 6 shows a general-purpose computer, it should be noted that the exact configuration of a portion of a system according to various embodiments may be slightly different. For example, a given processor-based device in one or more examples may be implemented as any suitable computer, such as a laptop computer, a tablet computer, a server computer, a smartphone, and/or the like.

In accordance with embodiments of the present disclosure, computer system 600 performs specific operations by CPU 601 executing one or more sequences of one or more instructions contained in system memory component 603. Such instructions may be read into system memory component 603 from another computer readable medium, such as ROM 604 or drive 606. In other embodiments, hard-wired circuitry may be used in place of (or in combination with) software instructions to implement the present disclosure.

Logic may be encoded in a computer readable, non-transitory medium. Such a medium may take many forms, including but not limited to, non-volatile media and volatile media. In various implementations, non-volatile media includes optical or magnetic disks, such as disk or solid-state drive component 606, and volatile media includes dynamic memory, such as system memory component 603. CPU 601 reads application code from the readable medium and executes the code to provide the described functionality.

In various embodiments of the present disclosure, execution of instruction sequences to practice the present disclosure may be performed by computer system 600. In various other embodiments of the present disclosure, a plurality of computer systems (not shown) coupled by communication link 612 (e.g., a communications network, such as a LAN, WLAN, PTSN, and/or various other wired or wireless networks, including telecommunications, mobile, and cellular phone networks) may perform instruction sequences to practice the present disclosure in coordination with one another.

It should be appreciated that like reference numerals are used to identify like elements illustrated in one or more of the figures, wherein these labeled figures are for purposes of illustrating embodiments of the present disclosure and not for purposes of limiting the same.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A computer program product having a non-transitory computer readable medium tangibly recording computer program logic for use in a secure computer system with a first human user and a second human user being authorized users of the secure computer system, the computer program product comprising:
   code to receive input from the first human user to select the second human user for authentication;
   code to electronically generate a secure code in response to the input from the first human user;
   code to display the secure code to the first human user;
   code to allow the second human user access to the secure computer system after the second human user has been verified by the secure computer system; and
   code to display the secure code to the second human user as the second human user accesses the secure computer system.

2. The computer program product of claim 1 in which the code to display the secure code to the first human user comprises code to send display data from the secure computer system to a processor-based device associated with the first human user.

3. The computer program product of claim 1 in which the display data comprises web page data.

4. The computer program product of claim 1 in which the secure computer system comprises an enterprise system communicating with the first and second human users over an intranet or the Internet.

5. The computer program product of claim 1 further comprising:
   code to receive an alphanumeric string approximating a name of the second human user; and
   code to consult a database, using the alphanumeric string, to generate a list of candidates to the first human user.

6. The method of claim 5 in which the received input comprises a selection of an entry from the list of candidates.

7. A mutual authentication system comprising:
   an authentication server for receiving respective credentials from a first human user and a second human user and granting or denying access to a secure computer system based on the respective credentials; and
   a communication server communicatively coupled to the authentication server and to the first and second human users, the communication server allowing access to authentication services by the first and second human users according to whether access is granted or denied by the authentication server; the communication server including functionality to generate a secure code in response to a request by the first human user and to make the secure code available to the second human user when the second human user is granted access to the secure computer system; wherein the authentication server and the communication server are included on a secure intranet and are accessible over the Internet.

8. The mutual authentication system of claim 7 further comprising:
   a directory server communicatively coupled to the communication server and allowing the communication server to identify authentication candidates for the first human user.

9. The mutual authentication system of claim 8 in which the authentication server, communication server, and directory server are included in a protected network of an employer, and in which the directory server provides access to a list of employees.

10. The mutual authentication system of claim 7 in which the communication server comprises a web server that sends web page information to the first and second human users.

11. A method of authenticating a participant to a conversation, the method comprising:
- accessing a secure system by a first party to the conversation, in which the secure system is available to the first or second party only when the first or second party is logged on to a secure computer network that limits use to authorized, identified users;
- selecting a second party from a database associated with the secure system, where the first party desires to authenticate the second party;
- generating a code within the secure system in response to a request by the first party;
- making the code available to the second party when the second party is verified within the secure system;
- receiving feedback, from the second party to the first party, including the code; and
- authenticating the second party in response to receiving the feedback.

12. The method of claim 11 in which the first and second parties are participants in a phone conversation.

13. The method of claim 11 in which the first party receives the feedback over the phone.

14. The method of claim 11 in which generating the code comprises:
- using a random number generator at a processor-based device to generate a pseudorandom alphanumeric string.

15. The method of claim 11 in which the secure system comprises a web portal within a password protected intranet.

16. The method of claim 15 in which the secure system renders the code on a first display for viewing by the first party and on a second display for viewing by the second party.

17. The method of claim 11 in which the secure system comprises a protected computer network of an employer, and in which the database comprises a list of employees of the employer.

18. The method of claim 11 further comprising providing an option to the second user to indicate that security has been breached.

* * * * *